Nov. 26, 1957 — A. DE PASCALE — 2,814,684
WEAR INDICATOR FOR BRAKES
Filed Nov. 8, 1956
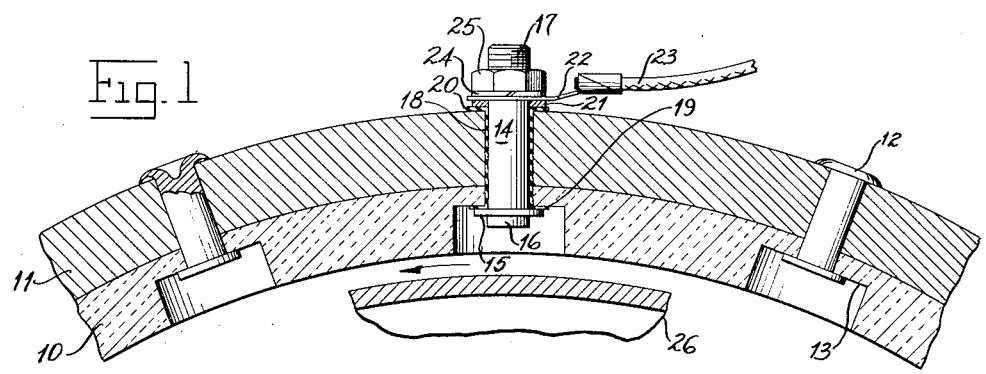
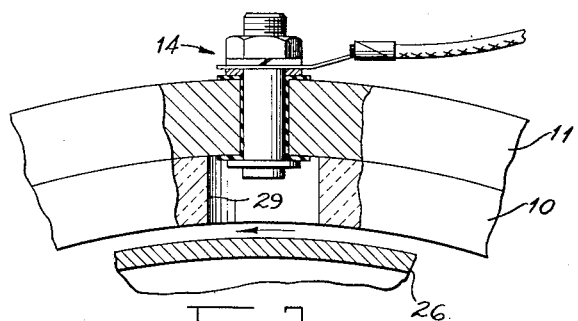
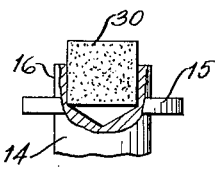
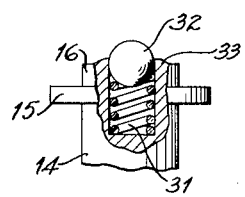
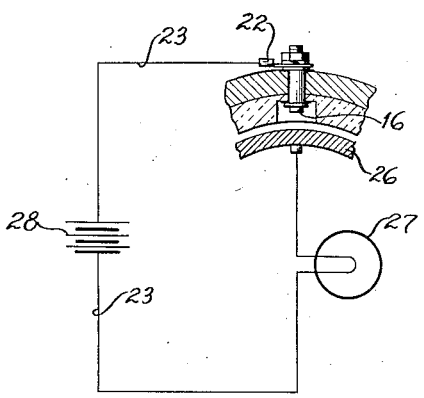
INVENTOR.
ANTHONY DE PASCALE
BY
Frank Makara
ATTORNEY

United States Patent Office 2,814,684
Patented Nov. 26, 1957

2,814,684

WEAR INDICATOR FOR BRAKES

Anthony DePascale, New York, N. Y.

Application November 8, 1956, Serial No. 621,081

2 Claims. (Cl. 200—61.4)

This invention relates to a device for indicating the degree of wear of a brake lining and more particularly it relates to an improved indicator for indicating the need for replacing a brake lining without damaging the metal brake drum surface.

It is an object of this invention to provide a wear indicator which will indicate the need for replacing the asbestos brake lining of a conventional brake without scratching or grooving the smooth brake surface.

It is another object to provide a wear indicator of the brake shoe of elevators, crane devices, etc.

These and other objects of this invention will become apparent upon reading the following disclosure of a plurality of embodiments taken in conjunction with the drawing in which:

Fig. 1 is a vertical section view of a part of a conventional riveted brake shoe showing the indicator disposed in a rivet hole, Fig. 2 is a vertical partial section view of a part of a conventional cycle-bonded brake shoe showing an asbestos lining bonded by cement to the metal shoe face, Fig. 3 is a sectional view of a modified contact head showing a graphite block fixedly disposed therein, Fig. 4 is a sectional view of another modified contact head having a spring loaded ball as the contact element, and Fig. 5 is a schematic circuit diagram showing a battery and electrical light in the circuit.

Elevator brakes are located on the top of a shaft cage and therefore remote from the elevator operator.

Conventional brakes made by riveting an asbestos curved lining to a metal brake shoe screetch when the asbestos becomes so thinly worn as to permit the rivet to engage the metal rotating drum braking surface.

This screetching of the rivets on the metal is often not heard by an elevator operator in a sound proof elevator cab.

Moreover the rivets, being metal, dig into the rotating metal drum to badly groove the drum, at the same time adversely affecting the braking action to the point of danger.

According to this invention the critical thinness of the asbestos lining is indicated without damaging the metal rotating braking drum and without creating a screetching sound.

To effect this result, the electrical contact of applicant's device is made through the use of a graphite contact, a ball contact or a soft brass metal contact with the rotating drum.

In elevator operation, the conventional brake shoes generally swingably converge upon the exterior surface of a centrally disposed rotating braking drum. However, this invention is also operable on shoes which diverge or expand to engage the interior surface of a braking drum as used in automobiles.

Turning now to the drawing, there is shown in Fig. 1 a cross section of an asbestos lining 10 conventionally riveted to a metal brake shoe 11 by a plurality of conventional rivets 12. The rivets 12 are seated on the countersunk ledge 13 of the asbestos lining 10 and their ends are conventionally turned over to fixedly secure the asbestos lining 10 to the metal shoe 11.

According to this invention one of the rivets is removed and the inventive device is inserted in lieu thereof.

The device of this invention comprises a suitable longitudinal rod 14 of suitable soft metal, for example, brass which on rubbing contact with the harder steel metal of the braking drum surface will not groove it. The rod 14 is provided with an integral annular ledge 15 suitably spaced from the head 16 of the rod 14. The bottom end of the rod 14 is provided with threads 17.

As shown in Fig. 1, the rod 14 is of a size to conveniently replace the rivet 12 with the rod ledge 15 engaging the asbestos undercut ledge 13 so that the rod head 16 protrudes but slightly beyond rod ledge 15 with the face of the head 16 disposed suitably below the exposed asbestos lining 10 surface.

The rod 14 is insulated from the metal brake shoe 11 by a sleeve 18 of insulating material such as plastic, rubber or paper. The sleeve is provided with an annular integral lip 19, which lip is disposed beneath rod ledge 15.

A round washer 20 of suitable insulating material is disposed over the threaded end 17 of the rod 14 and upon metal brake shoe 11.

Next a suitable metal washer 21 is disposed over the threaded end 17 of rod 14. Thereafter a conventional apertured terminal contact point 22 having an electrical wire 23 crimped fixedly therein is disposed over rod 14 onto washer 21. Then a split ring lock washer 24 is disposed upon the contact terminal point 22 and lastly a nut 25 is threaded onto rod 14 engaging rod threads 17 and fixedly securing the assembly of parts to the brake shoe.

The rotating metal braking drum 26 engages the exposed asbestos surface 10 when the brake shoe is moved toward the drum 26. This engagement causes the drum 26 to stop, but some of the brake asbestos lining is worn off during this procedure.

In due time the asbestos lining is so worn that the contact head 16 of rod 14 engages the metal drum 26. As shown in Fig. 5, the drum 26 is in an electrical circuit having a conventional light 27 and a battery 28 all interconnected by wire 23. Clearly when the asbestos becomes so worn that head 16 engages rotating drum, the light circuit is completed and the light 27 lights up indicating need for replacing the worn asbestos lining.

Turning to Fig. 2, there is shown the manner of securing the invention to a brake shoe having a bonded asbestos lining. In this instance, the asbestos is drilled to form a suitable aperture 29. The walls of aperture 29 may be extended through to the metal brake shoe 11. In this instance, the insulator sleeve 18 has its lip 19 disposed onto the metal brake shoe 11 instead upon an asbestos undercut ledge 13, as in Fig. 1. Thus this invention is applicable to riveted or to bonded asbestos linings on the brake shoes. Since rod 14 is made of soft brass it will not scratch the moving drum 26 on contact therewith.

Preferably the rod 14 is provided with a protruding graphite contact point 30 fixedly secured in a suitable well in the head face as by being press fitted into the well. In this instance when the asbestos lining is worn down the graphite point 30 makes electrical contact with the rotating drum. And since the protruding graphite is a lubricant it will not mar or scratch the drum 26 on contact therewith.

Turning to Fig. 4, there is shown another embodiment of this invention. In this invention the rod 14 is provided with a suitable well in the head 16 face and a tension spring 31 is disposed therein. Next a hard metal ball 32 is disposed on the spring 31 and the annular metal 33 about the well mouth is crimped or pressed upon the ball above the diameter of the ball but away from the top of the ball, thereby fixedly securing the ball 32 in the well of head 16. The ball 32 is free to revolve but it is captively held in the well of the head 16. The preferred form of this invention is that shown in Fig. 4.

When a rod 14 with a ball 32 is employed, the ball 32 engages the drum 26 when the asbestos lining 10 becomes worn. In such a case the ball 32, revolves as it contacts the drum 26 and since the ball is spring loaded it can not scratch the drum 26 surface.

This invention has been illustrated by a plurality of embodiments but it is not to be limited to these illustrations.

I claim:

1. In an electrical wear indicator for automobile brakes having a contact point suitably embedded in an asbestos brake lining in spaced relationship to the original brake surface, said contact point being insulated from the metal ground of the automobile and being electrically connected to an electrical alarm indicator, the improvement comprising providing said contact point with a suitable cavity, disposing a spring in said cavity and placing a discrete floating contact point on said spring captively in said cavity whereby wearing of said brake lining effects a ground contact with said floating discrete contact point in said cavity thereby electrically completing the alarm circuit without scoring of the metal brake drum.

2. The wear indicator of claim 1 wherein the cavity is cylindrical, the spring is a coil spring and the floating contact point is a metal ball disposed captively in said cavity by the peened edges of said cavity seizing said ball above the horizontal diameter.

References Cited in the file of this patent

UNITED STATES PATENTS

| | | |
|---|---|---|
| 2,146,357 | Schweikle | Feb. 7, 1939 |
| 2,636,090 | Branschofsky | Apr. 21, 1953 |